(12) United States Patent
Mattiello et al.

(10) Patent No.: US 8,839,845 B2
(45) Date of Patent: Sep. 23, 2014

(54) HEATING AND AIR CONDITIONING UNIT FOR MOTOR-VEHICLES

(75) Inventors: Fabrizio Mattiello, Orbassano (IT); Angelo Storgato, Orbassano (IT); Chiara Vicari, Orbassano (IT); Giuseppe Chiabotto, Turin (IT); Alessio Sarcoli, Turin (IT)

(73) Assignee: C.R.F. Societa Consortile per Azioni, Orbassano (Turin) (IT)

( * ) Notice: Subject to any disclaimer, the term of this patent is extended or adjusted under 35 U.S.C. 154(b) by 937 days.

(21) Appl. No.: 13/001,948

(22) PCT Filed: Dec. 3, 2009

(86) PCT No.: PCT/IB2009/055485
§ 371 (c)(1),
(2), (4) Date: Dec. 29, 2010

(87) PCT Pub. No.: WO2010/070514
PCT Pub. Date: Jun. 24, 2010

(65) Prior Publication Data
US 2011/0114283 A1    May 19, 2011

(30) Foreign Application Priority Data
Dec. 16, 2008    (IT) .............................. TO2008A0937

(51) Int. Cl.
*B60H 1/00*    (2006.01)

(52) U.S. Cl.
CPC ........ *B60H 1/00685* (2013.01); *B60H 1/00857* (2013.01)
USPC ............... 165/42; 165/43; 454/121; 454/126; 454/159; 454/160; 454/161; 454/152; 237/12.3 A; 237/12.3 B

(58) Field of Classification Search
CPC .............. B60H 1/0021; B60H 1/0028; B60H 1/00542; B60H 1/00678; B60H 1/00685; B60H 1/00842; B60H 2001/00092; B60H 2001/000721

USPC ........ 165/201, 202, 203, 42, 43, 41; 454/152, 454/158, 121, 126, 159, 160, 161; 237/12.3 A, 12.3 B
See application file for complete search history.

(56) References Cited

U.S. PATENT DOCUMENTS

| 2,634,669 A | | 4/1953 | Greenmun |
| 2,730,032 A | * | 1/1956 | Greenmun ..................... 454/158 |
| 4,597,323 A | * | 7/1986 | Mordau et al. ................ 454/158 |

FOREIGN PATENT DOCUMENTS

| DE | 33 30 951 | 3/1985 |
| DE | 195 18 280 | 12/1995 |

(Continued)

OTHER PUBLICATIONS

International Search Report for PCT/IB2009/055485, mailed Mar. 18, 2010.
Written Opinion of the International Searching Authority for PCT/IB2009/055485, mailed Mar. 18, 2010.

*Primary Examiner* — John Ford
(74) *Attorney, Agent, or Firm* — Nixon & Vanderhye P.C.

(57) ABSTRACT

A heating and air conditioning device for motor-vehicles, comprises a unit for suctioning and supplying air (13) and a heating and air conditioning unit (1), including a heater (2) and an evaporator (3) and a mixing lid (4) for distributing the airflow coming from the supply unit (13) between said heater (2) and said evaporator (3). The heating and air conditioning unit comprises a single moveable element for distributing the conditioned airflow between one or more outlets arranged along a dashboard of a motor-vehicle, respectively adjacent to the windscreen, at the front on the dashboard or adjacent to the floor of the cabin of the motor-vehicle, to respectively actuate the DEFROST, VENT, FLOOR functions or their combination. At least part of the air supply unit (13), preferably at least one air intake (14) and one pipe (15) for supplying air including an air filter (16), and borne by a bodywork connected to a front bonnet (22) of the motor-vehicle which closes the engine compartment at the upper part.

6 Claims, 11 Drawing Sheets

(56) References Cited

FOREIGN PATENT DOCUMENTS

Figure 1:
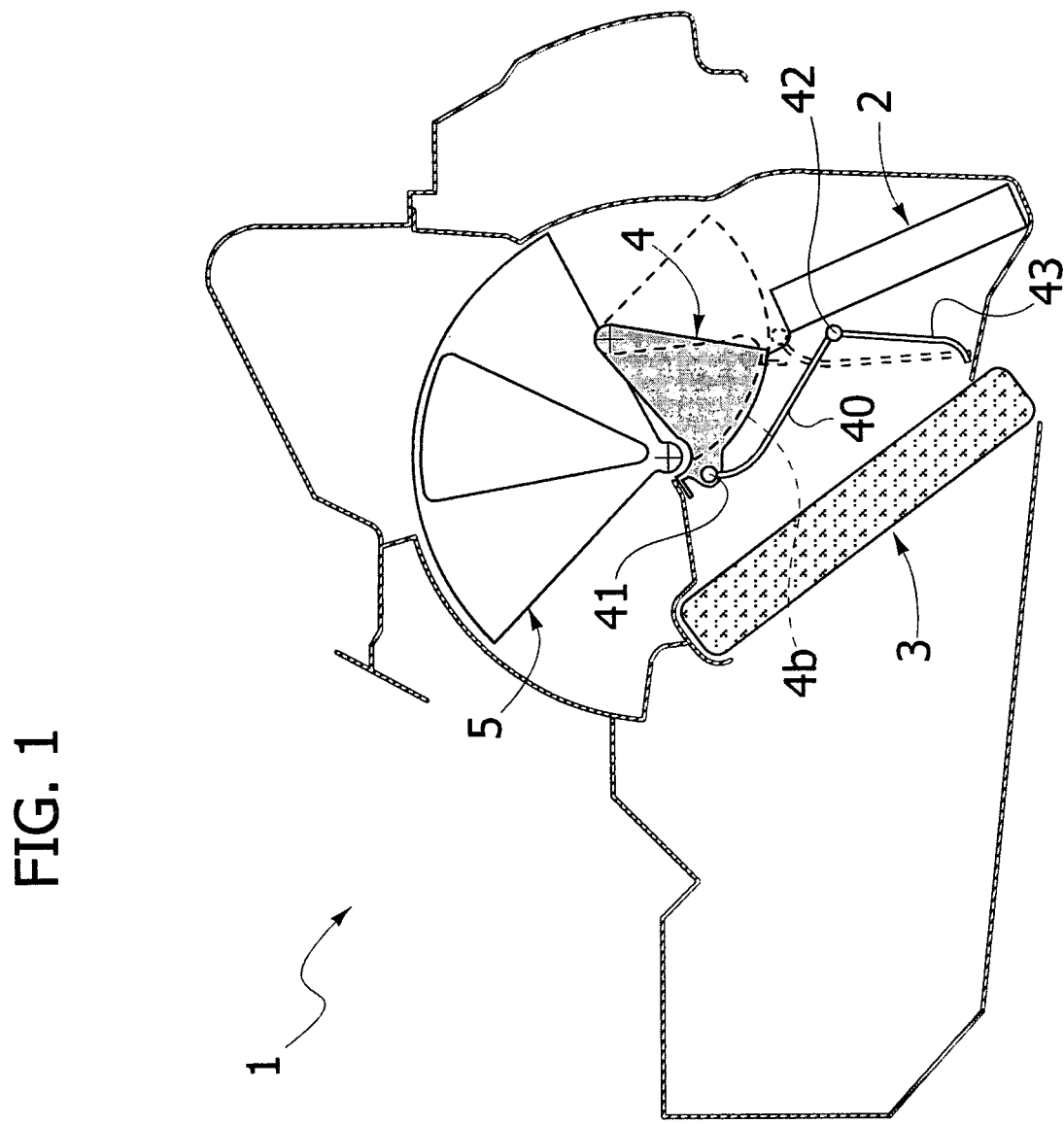

| | | |
|---|---|---|
| DE | 19518280 A1 * | 12/1995 |
| DE | 18 11 189 | 9/1999 |
| DE | 19811189 C1 * | 9/1999 |
| JP | 2003039930 A * | 2/2003 |
| WO | WO 2004/078497 | 9/2004 |
| WO | WO 2004078497 A1 * | 9/2004 |

* cited by examiner

HEATING AND AIR CONDITIONING UNIT FOR MOTOR-VEHICLES

This application is the U.S. national phase of International Application No. PCT/IB2009/055485 filed 3 Dec. 2009, which designated the U.S. and claims priority to IT Application No. TO2008A000937 filed 16 Dec. 2008, the entire contents of each of which are hereby incorporated by reference.

The present invention refers to heating and air conditioning devices for motor-vehicles, of the type comprising:

an air suction and supply unit, a heating and air conditioning unit, comprising a heater, an evaporator and a mixing lid for distributing the airflow coming from said supply unit between said heater and said evaporator, and means for distributing the airflow coming from said heating and air conditioning unit between one or more outlets distributed along a dashboard of the motor-vehicle, respectively adjacent to the windscreen, at the front part of the dashboard or adjacent to the floor of the motor-vehicle, to respectively actuate DEFROST, VENT or FLOOR functions, or their combination.

The object of the present invention is that of providing a device of the type indicated above having a simple and reliable structure and configured in such a manner to occupy least space within the body of the motor-vehicle dashboard.

In order to attain such object, the invention provides for a device having the characteristics indicated above and also characterized in THAT the abovementioned means for distributing airflow between the DEFROST, VENT and FLOOR outlets are made up of a single moveable element having several operational positions.

In the preferred embodiment, the abovementioned single moveable element which controls the distribution of air between the DEFROST, VENT and FLOOR outlets is made up of a hollow disc-shaped body, mounted rotating around its axis, with two opposite main surfaces flat and orthogonal to the rotation axis, a circumferential wall and two end radial walls. The two main opposite walls have two central apertures intended to cooperate with two corresponding pipe inlets for supplying air to the FLOOR outlets. The circumferential wall has two end inlets intended to cooperate with corresponding pipe inlets for supplying air to the DEFROST and VENT outlets.

Providing a single moveable element for controlling the DEFROST, VENT and FLOOR outlets allows simplifying the structure and hence reducing the costs for manufacturing the heating and air conditioning unit. The specific configuration described above regarding the abovementioned moveable element also allows reducing the actuation load, in that the movement of such moveable element does not contrast the incoming airflow, as it occurs instead with the traditional butterfly or flag lids. The aforedescribed structure of such moveable element prevents or reduces the risk of jamming that occurs in traditional solutions instead.

Preferably, the abovementioned heating and air conditioning unit is mounted centrally in the motor-vehicle dashboard, while the abovementioned unit for suctioning and supplying air arranged in the engine compartment, with a part fixed with respect to the bodywork of the vehicle and the remaining part, as already mentioned, connected to the bodywork of the front bonnet of the motor-vehicle. Therefore, when the front bonnet is opened, the abovementioned part of the air suctioning unit which is borne by the bonnet moves therewith, separating from the remaining part joined to the bodywork of the motor-vehicle. When the front bonnet is closed, the air supply unit part which is borne by the bonnet returns to its operational position being coupled with the part of the air supply unit which is joined to the bodywork of the motor-vehicle. In such condition, respective connection inlets provided for on the moveable part and on the fixed part of the air supply unit are coupled to each other, ensuring continuity of the air supply pipe.

Figure 2:
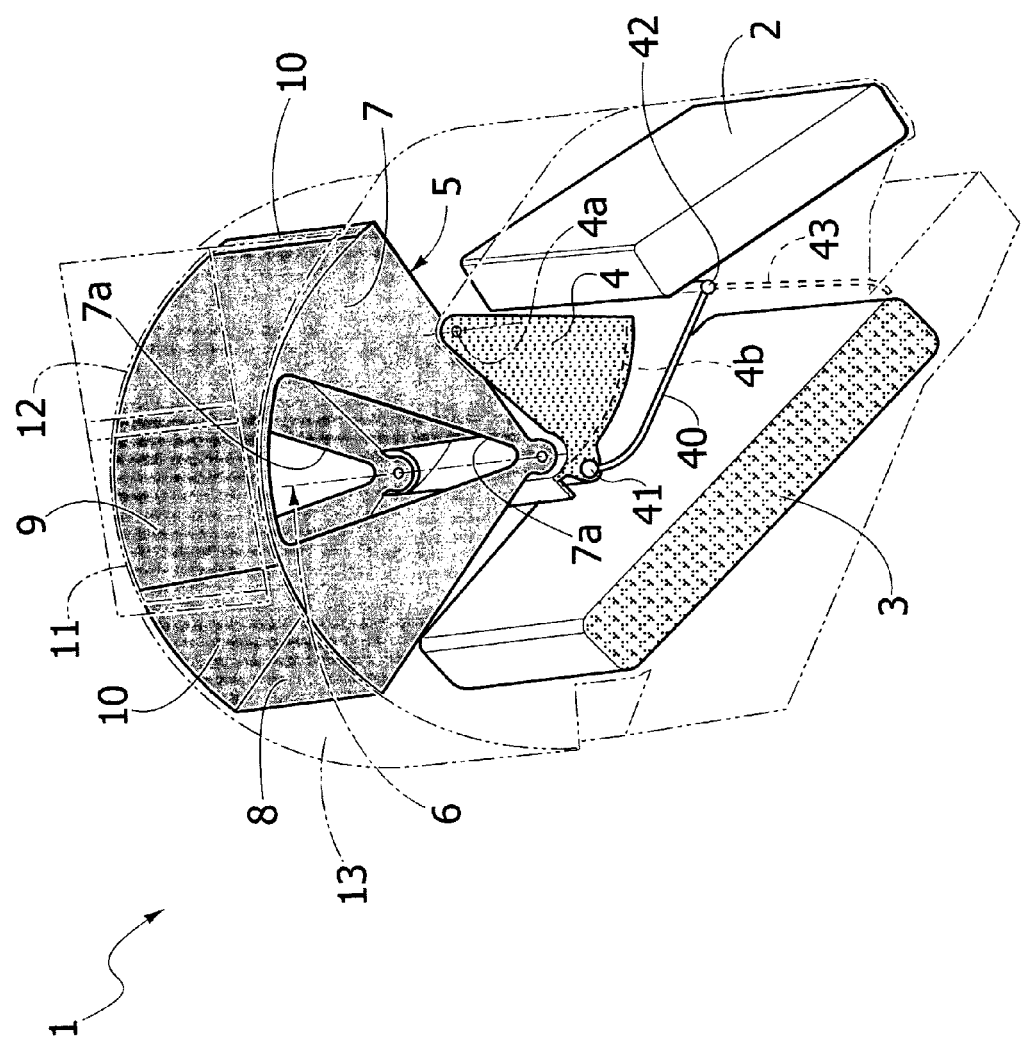
Figure 3:
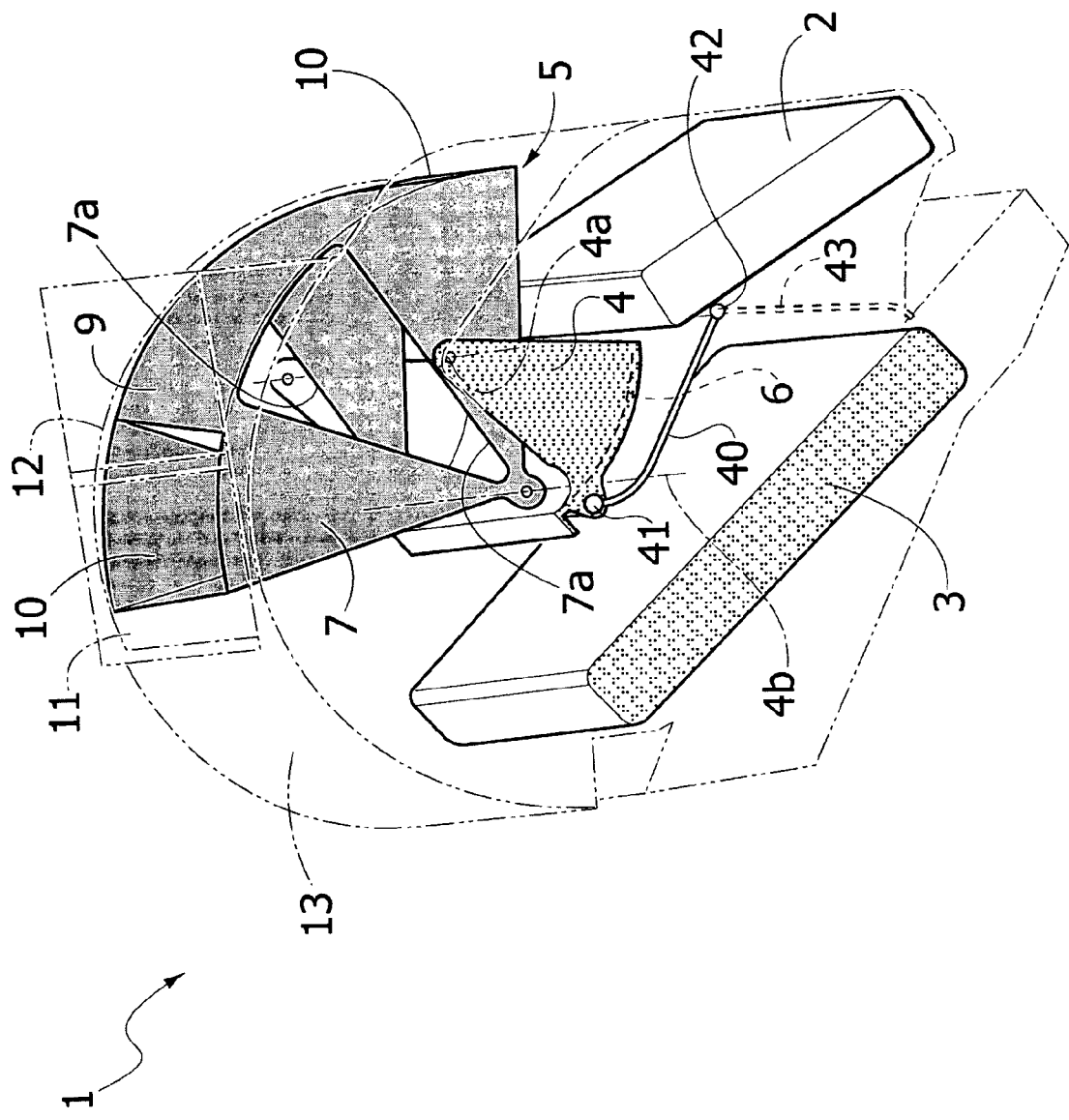
Figure 4:
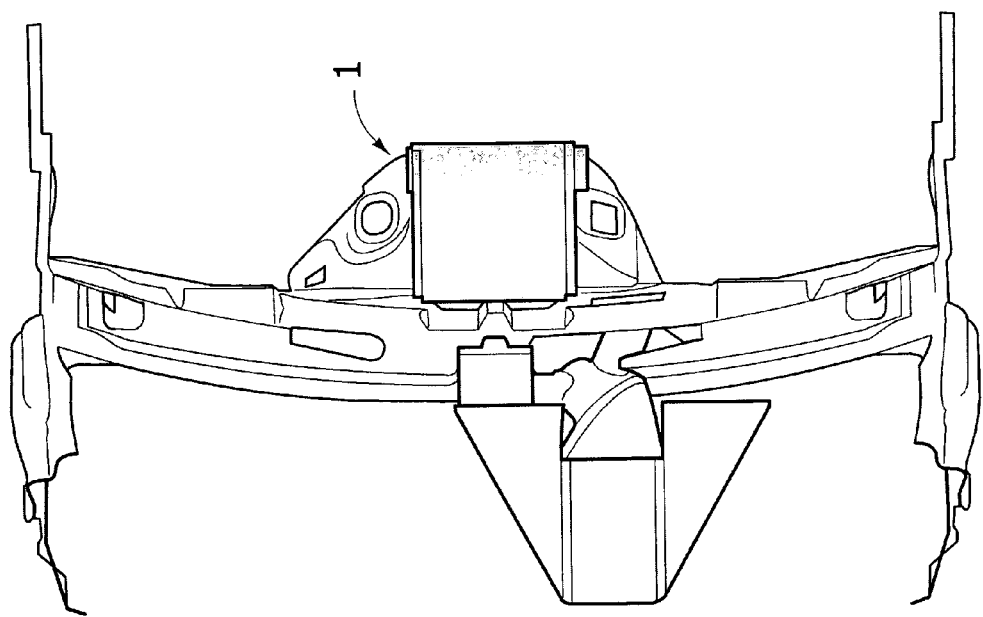
Figure 5:
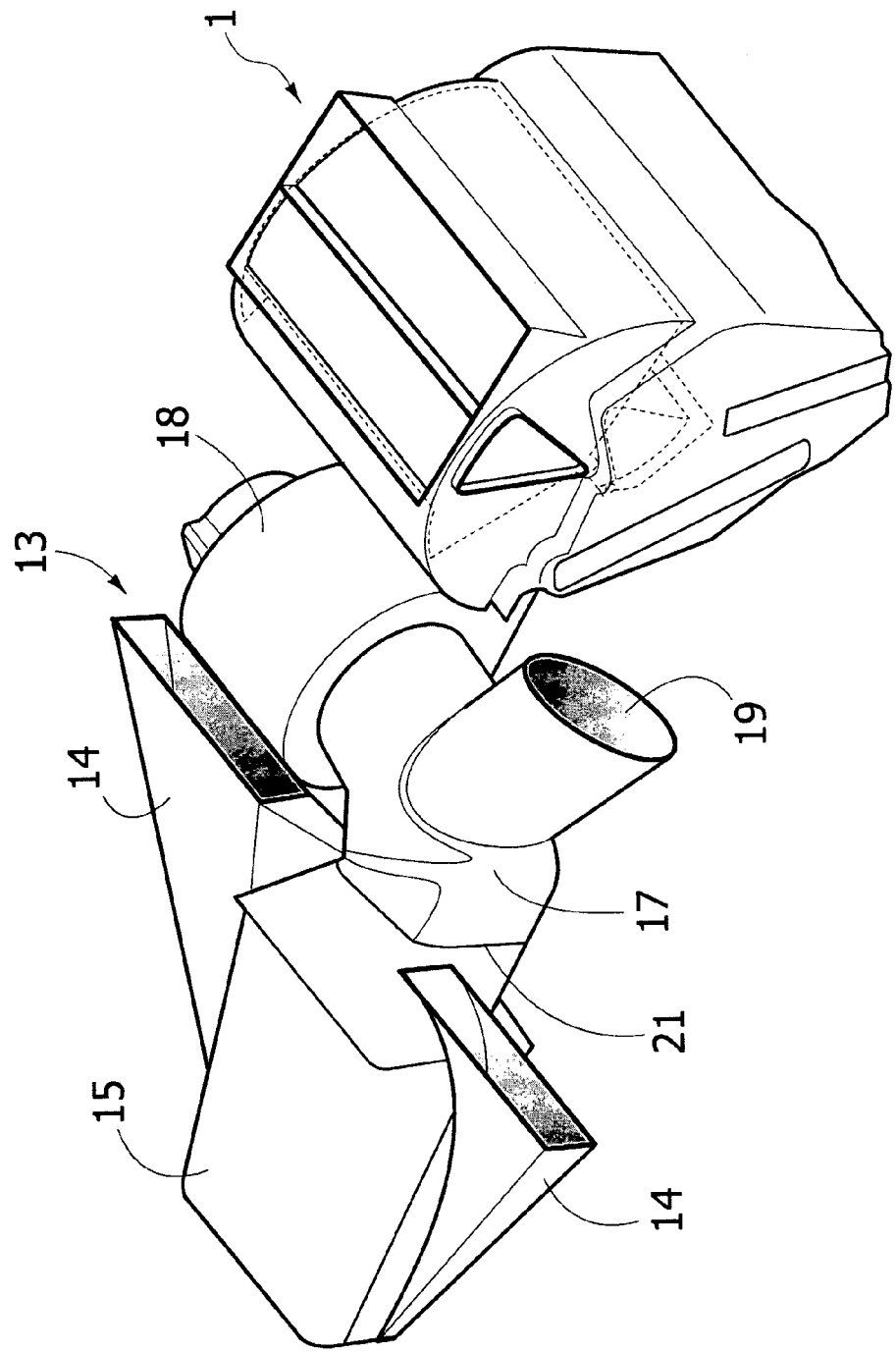
Figure 6:
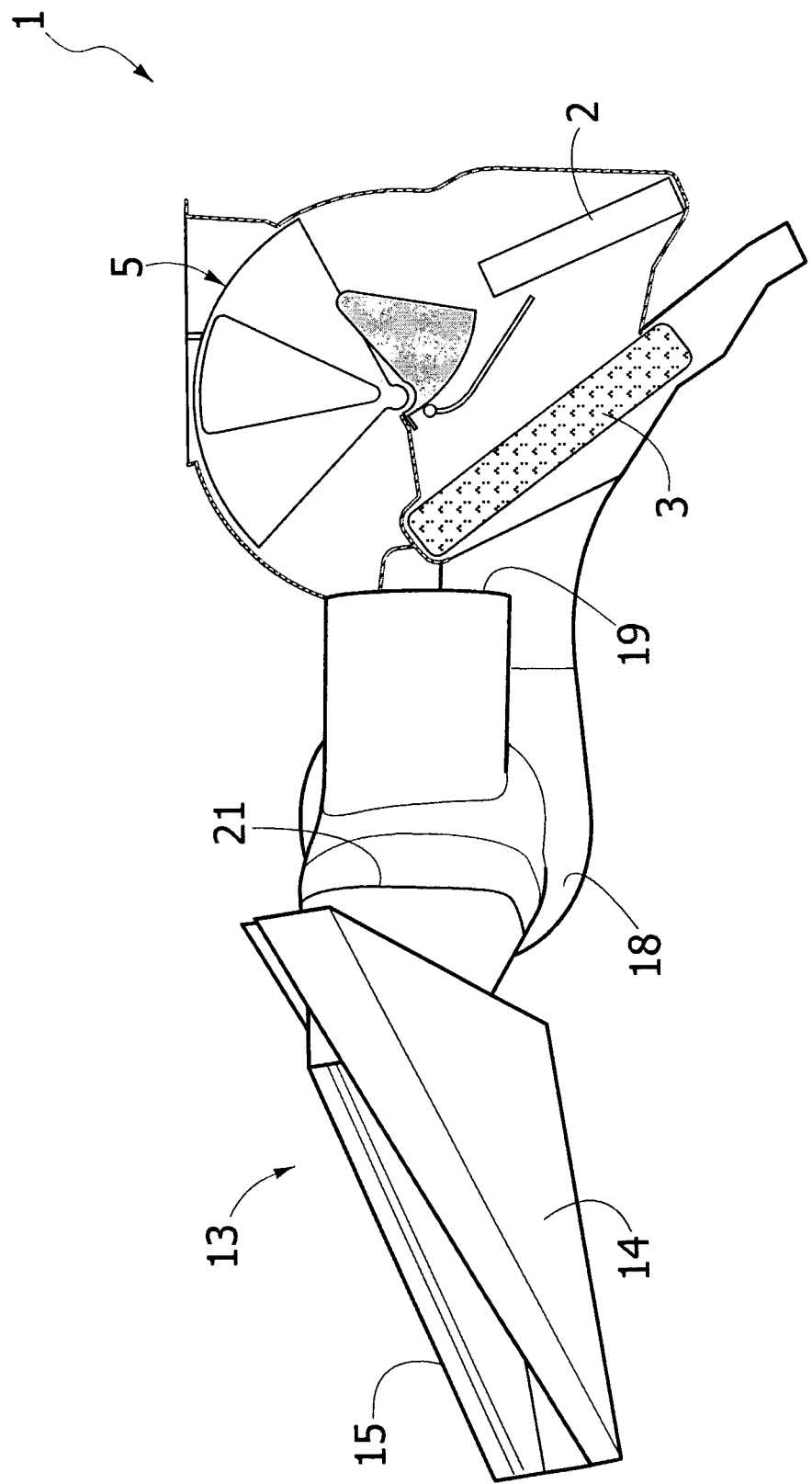
Figure 7:
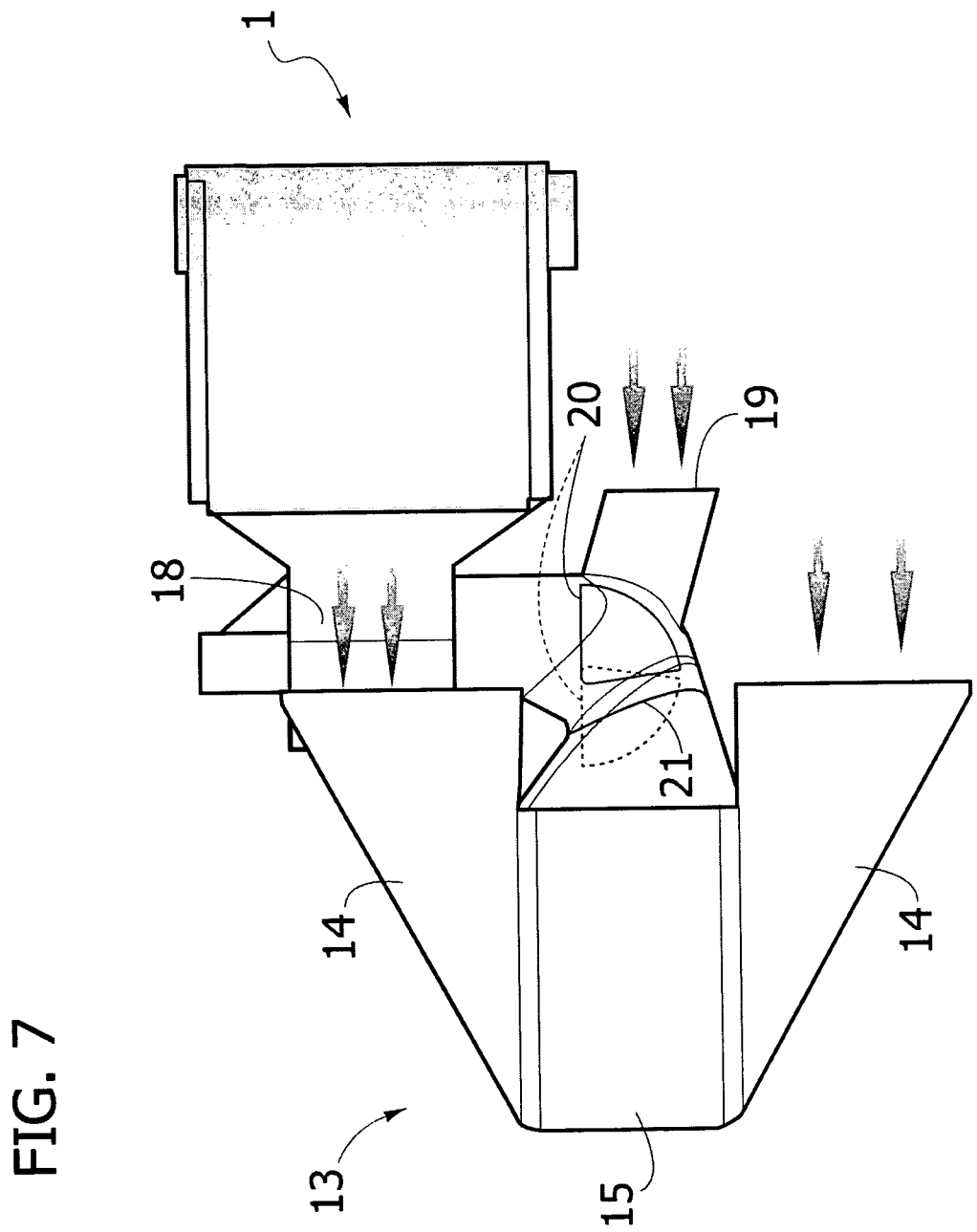
Figure 8:
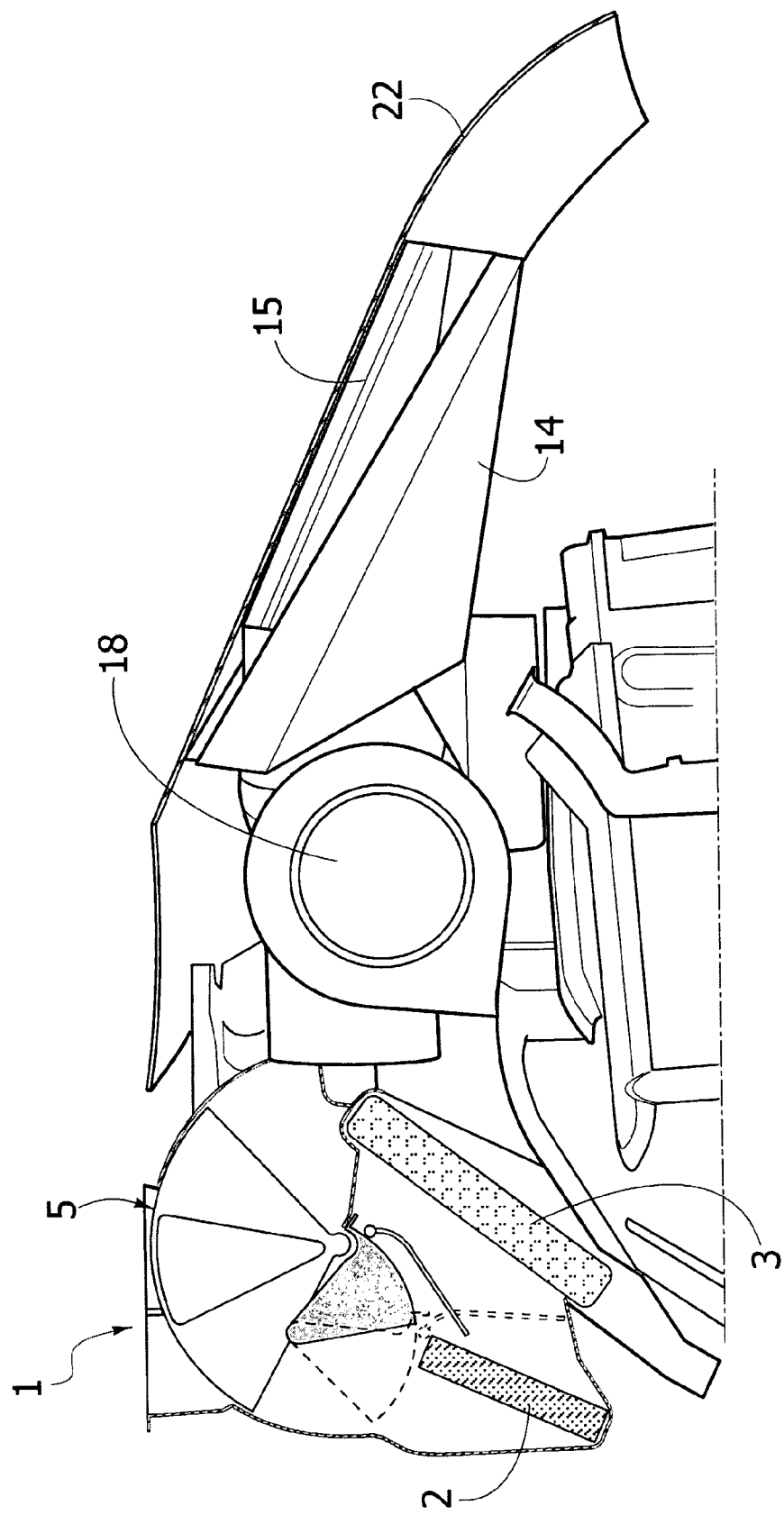
Figure 9:
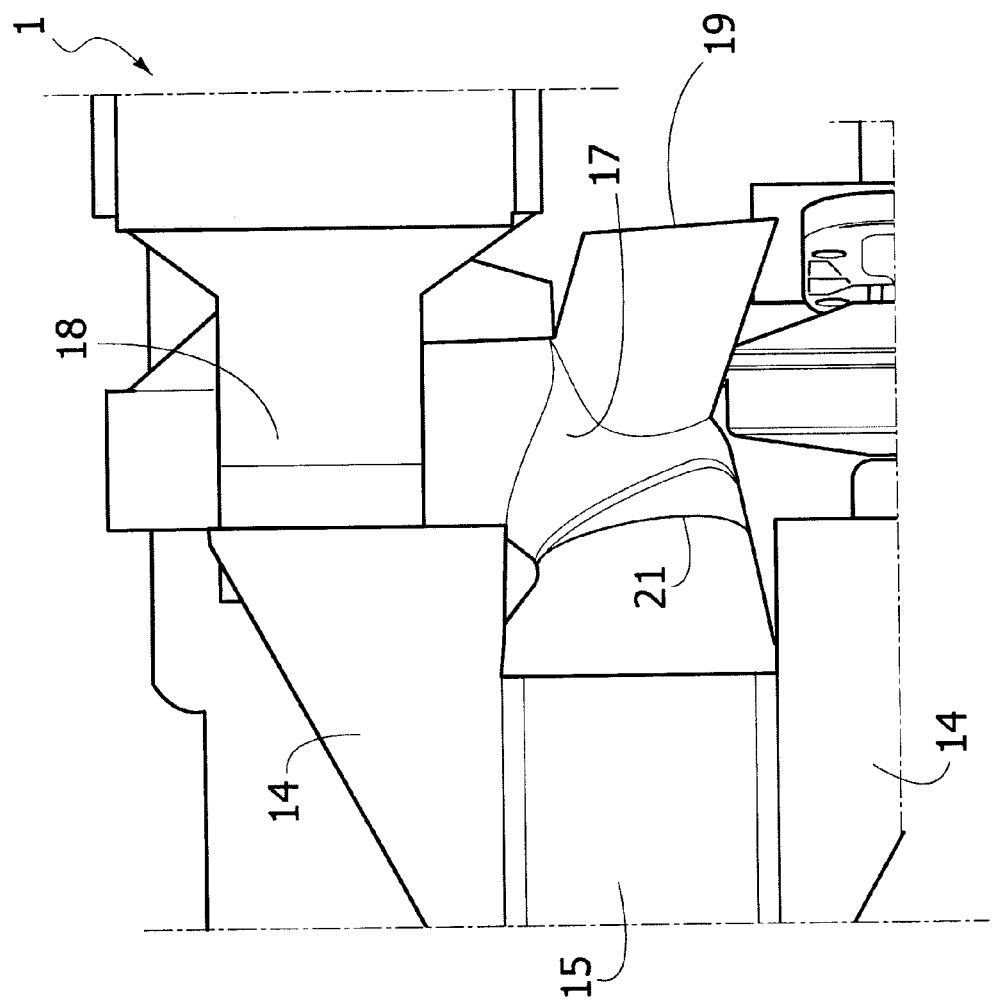
Figure 10:
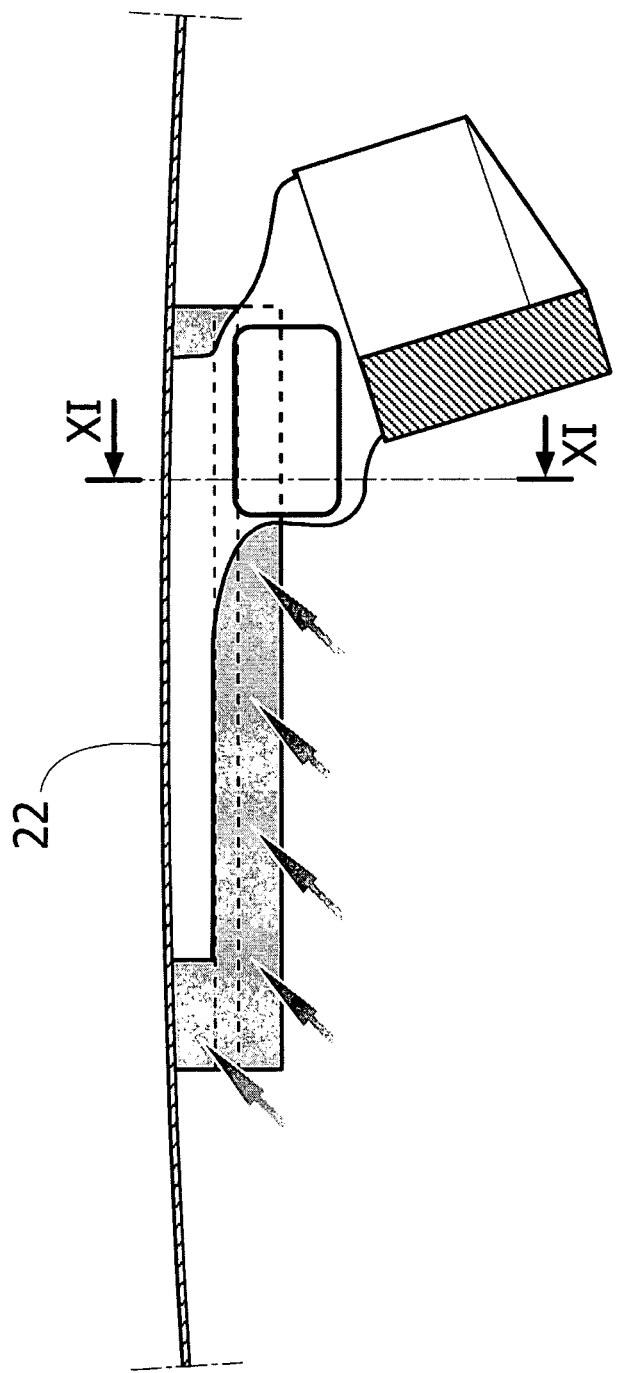
Figure 11:
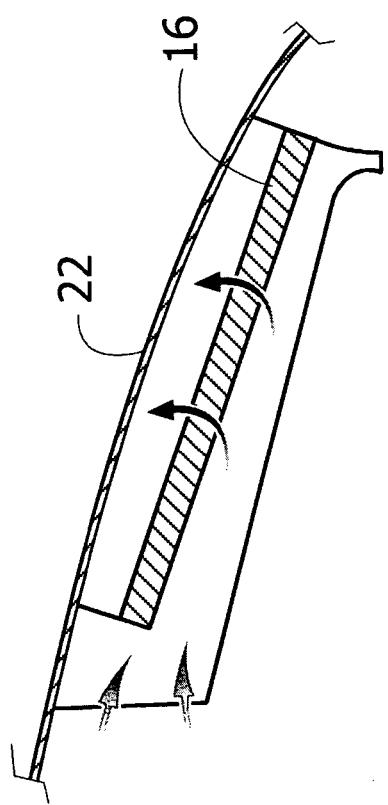
Figure 12:
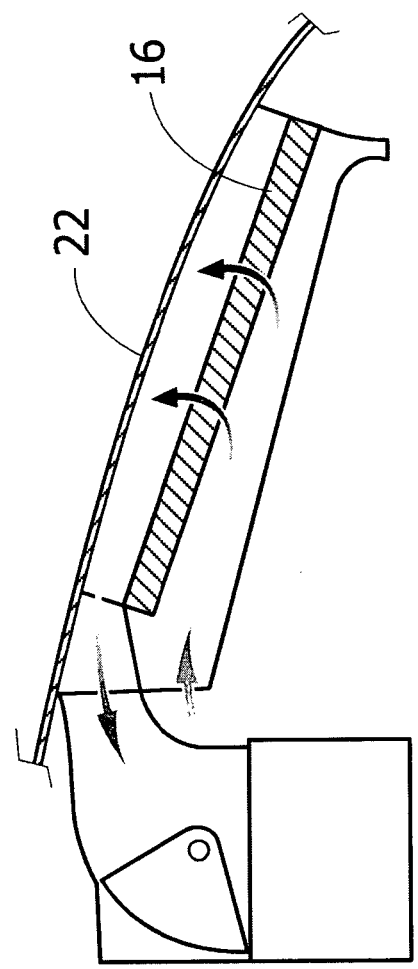

Further characteristics and advantages of the invention shall be clear from the following description with reference to the attached drawings, strictly provided for exemplifying and non-limiting purposes, wherein:

FIG. 1 is a schematic sectional view of the heating and air conditioning unit according to the invention, FIGS. 2, 3 are perspective views of the heating and air conditioning unit according to the invention in two different operational conditions, FIG. 4 is a plan view of the device according to the invention in the condition mounted in the bodywork of the motor-vehicle, FIG. 5 is a schematic perspective view of the device according to the invention, developing in the longitudinal direction of the vehicle, FIG. 6 is a lateral view of the unit of FIG. 5, FIG. 7 is a plan view of the unit of FIG. 5, FIG. 8 is a lateral view showing the positioning of part of the air supply unit on the bodywork of the front bonnet of the motor-vehicle, FIG. 9 is a further plan view of the device according to the invention, and FIGS. 10-12 are sectional schematic views illustrating the air supply unit part of the device according to the invention.

Referring to the drawings, a heating and air conditioning unit, comprising a heater 2, an evaporator 3 and a mixing member 4 for distributing the airflow coming from a supply unit (illustrated in detail hereinafter) between said heater 2 and said evaporator is indicated in its entirety with 1. The mixed air that has passed through the heater 2 and/or the evaporator 3 is distributed, through a single distribution member 5 between one or more flow outlets provided for on the dashboard of the motor-vehicle, respectively adjacent to the windscreen (DEFROST) or at the front towards the passengers (VENT outlet) or adjacent to the floor of the cabin of the motor-vehicle (FLOOR outlet).

As observable in FIGS. 2, 3, the single distribution member 5 has a substantially disc-shaped body mounted rotating around its axis, indicated with 6 and including two main opposite walls 7, orthogonal to the axis 6, two radial end walls 8 and a circumferential wall 9. The two main opposite walls 7 have two triangular central apertures 7a intended to cooperate with the inlets facing thereto of two pipes that lead to the FLOOR outlets. The circumferential wall 9 has end apertures 10 intended to cooperate with the outlet inlets 11, 12 of pipes that respectively lead to the VENT and DEFROST outlets. The pipe inlets that cooperate with the apertures of the moveable element 5 are obtained in a fixed cylindrical casing 13 in which the moveable element 5 rotates.

FIG. 2 of the attached drawing shows the moveable element 5 in its central position, wherein the apertures 7a fit perfectly with the inlets of the pipes that lead to the FLOOR outlets, hence such outlets are supplied with air, while the inlets of the pipes which lead to the VENT and DEFROST outlets are closed by the closed portion of the circumferential wall 9 of the moveable element 5. FIG. 3 shows the moveable element 5 at an end position wherein the air is conveyed to the VENT outlet. At the opposite side, the moveable element may be positioned in such a manner to open the DEFROST outlet alone. Furthermore, the moveable element has two intermediate positions, between the central position and each of its two end portions, to supply air in combination with the VENT and FLOOR outlets or the DEFROST and FLOOR outlets.

The mixing member 4 is mounted rotating around an axis 4a. It has two opposite flat walls, orthogonal to the axis 4a, in form of circle sections, connected to each other by a peripheral curved wall 4b which serves as a lid. Connected in an articulated manner to the mixing member is an end edge 41 of a panel 40 having—adjacent to the opposite end edge thereof—two side pins 42 guided into shaped slots 43 obtained in the walls of the body of the casing of the heating and air conditioning unit. The arrangement is such that when the member 4 is in its end position illustrated in FIG. 1 and in FIG. 2, the panel 40 leaves the access to the heater 2 open for the airflow which has passed through the evaporator 3. In the opposite end position of the member 4, illustrated in FIG. 1 with the dashed line, the panel 40 closes the access to the heater 2, while the wall 4b closes the outlet downstream of the heater. Such is the situation wherein the heater is entirely excluded.

As clearly observable in FIG. 4, the heating and air conditioning unit 1 is mounted on the bodywork of the motor-vehicle in such a manner to be positioned inside the dashboard of the motor-vehicle and centrally with respect to the width of the motor-vehicle. Referring to FIG. 5, the heating and air conditioning unit 1 receives air from a unit for suctioning and supplying air 13 which is provided for in the engine compartment. Such unit comprises, in the case of the illustrated example a pair of air intakes 14 that convey the air through a pipe 15, including an air filter 16 (see FIG. 11, 12). The filtered air is conveyed by a pipe 17 (FIG. 5) towards a suction fan which supplies air to the heating and air conditioning unit 1. The pipe 17 may also receive air from an auxiliary pipe 19 which suctions air from the cabin of the motor-vehicle. The communication of the pipe 19 with the fan 18 is controlled by a moveable element 20, observable in FIG. 7, and moveable between a first operational position wherein the pipe communicates with the fan 18, and a second operational position, wherein such communication is interrupted.

The line indicated with 21 in FIGS. 6-9, indicates the separation between the part of the air supply unit 13 that is integral with the bodywork of the motor-vehicle and the part that is moveable with the front bonnet 22 of the motor-vehicle. As observable, the moveable part includes air intakes 14 and the pipe 15 including the air filter 16 (see also FIG. 10-12). At the separation line 21, the fixed part and the moveable part of the supply unit 13 have inlets preferably provided with sealing gaskets, which come into contact with respect to each other, guaranteeing continuity of the pipe for conveying air, when the front bonnet is moved from the open position to the closed position. The mounting of the moveable part of the suction unit 13 on the front bonnet 22 is also clearly observable in FIG. 8.

FIGS. 10-12 show the path of the air through the unit for suctioning and supplying air 13, according to a configuration illustrated schematically.

Obviously, without prejudice to the principle of the invention, the details and embodiments may vary, even significantly, with respect to what has been described herein by way of non-limiting example only, without departing from the scope of the present invention.

The invention claimed is:

1. A motor-vehicle heating and air conditioning device comprising:
   a supply unit for suctioning and supplying air,
   a heating and air conditioning unit comprising a heater and an evaporator and a mixing lid for distributing the airflow coming from said supply unit between said heater and said evaporator, and
   means for distributing the airflow coming from said heating and air conditioning unit between one or more outlets distributed along a dashboard of the motor-vehicle, respectively adjacent to the windscreen, at the front on the dashboard or adjacent to the floor of the cabin of the motor-vehicle, to respectively actuate the DEFROST, VENT, or FLOOR functions, or their combination,
   wherein the abovementioned means for distributing the airflow between DEFROST, VENT, and FLOOR outlets are made up of a single moveable element having several operational positions,
   wherein said single moveable element has a substantially disc-shaped body, mounted rotating around its axis, and having two main opposite walls orthogonal to the abovementioned axis, a circumferential wall, and two radial end walls, said main opposite walls and said circumferential wall having apertures suitable to cooperate with corresponding inlets of pipes for conveying air to respective FLOOR, DEFROST, VENT outlets,
   wherein the abovementioned single moveable element has five operational positions, respectively corresponding to a sole actuation of the DEFROST outlets, a sole actuation of the VENT outlets, a sole actuation of the FLOOR outlets, a combined actuation of the VENT and FLOOR outlets, and a combined actuation of the DEFROST and FLOOR outlets,
   wherein said mixing member is rotatably mounted around an axis and has two opposite flat walls, orthogonal to said axis, in a form of circle sections, connected to each other by a peripheral curved wall which serves as a lid,
   wherein connected in an articulated manner to the mixing member is an end edge of a panel having, adjacent to an opposite end edge thereof, two side pins guided into shaped slots obtained in the walls of the body of the casing of the heating and air conditioning unit, and
   said mixing member has a first end position in which said panel leaves an access to the heater open for the airflow which has passed through the evaporator, and a second end position, in which said panel closes the access to the heater, while said curved wall closes the outlet downstream of the heater.

2. A motor-vehicle comprising the heating and air conditioning device according to claim 1, wherein at least part of the supply unit is borne by a bodywork connected to a front bonnet of the motor-vehicle, which closes an engine compartment at an upper part.

3. The motor-vehicle according to claim 2, wherein the components of the abovementioned supply unit are extended in a longitudinal direction of the motor-vehicle before the heating and air conditioning unit.

4. The motor-vehicle according to claim 2, wherein the at least part of the supply unit comprises at least one air intake and one pipe for supplying air incorporating an air filter.

5. The motor-vehicle according to claim 2, wherein said heating and air conditioning unit is mounted inside a dashboard of the motor-vehicle centrally with respect to a width of the motor-vehicle and the abovementioned supply unit is provided for in the engine compartment, a moveable and a fixed part of said supply unit comprising inlets that fit to each other along a line when the front bonnet of the motor-vehicle is in its closed position, in such a manner to guarantee continuity of the pipe for conveying air.

6. The motor-vehicle according to claim 5, wherein the components of the abovementioned supply unit are extended in a longitudinal direction of the motor-vehicle before the heating and air conditioning unit.

\* \* \* \* \*